(12) United States Patent
Rinne et al.

(10) Patent No.: US 9,792,287 B2
(45) Date of Patent: Oct. 17, 2017

(54) METHOD AND APPARATUS FOR PROVIDING METADATA SEARCH CODES TO MULTIMEDIA

(71) Applicant: P2S Media Group Oy, Helsinki (FI)

(72) Inventors: Timo Johannes Rinne, Helsinki (FI); Ville Aleksi Laurikari, Littoinen (FI)

(73) Assignee: P2S Media Group Oy, Helsinki (FI)

( * ) Notice: Subject to any disclaimer, the term of this patent is extended or adjusted under 35 U.S.C. 154(b) by 0 days.

(21) Appl. No.: 14/367,927

(22) PCT Filed: Dec. 19, 2012

(86) PCT No.: PCT/FI2012/051270
§ 371 (c)(1),
(2) Date: Jun. 22, 2014

(87) PCT Pub. No.: WO2013/098475
PCT Pub. Date: Jul. 4, 2013

(65) Prior Publication Data
US 2014/0351277 A1    Nov. 27, 2014

(30) Foreign Application Priority Data
Dec. 29, 2011  (FI) ..................... 20116331

(51) Int. Cl.
*G06F 17/30*   (2006.01)
*H04N 21/231*  (2011.01)
*H04N 21/232*  (2011.01)

(52) U.S. Cl.
CPC .. *G06F 17/30041* (2013.01); *G06F 17/30241* (2013.01); *H04N 21/231* (2013.01); *H04N 21/232* (2013.01)

(58) Field of Classification Search
USPC ....................................... 707/724
See application file for complete search history.

(56) References Cited

U.S. PATENT DOCUMENTS 5,226,165 A * 7/1993 Martin ................ G06F 8/30
                                        707/758
6,336,111 B1 * 1/2002 Ashby et al. ............ 707/715
(Continued)

FOREIGN PATENT DOCUMENTS

CA    2712028 A1   11/2010
EP    1798646 A1   10/2006
(Continued)

OTHER PUBLICATIONS

Puttemans, A. et al. 'set imageData pulled from EXIP—reverse geocoding'. In zenPHOTO [online]. Forum articles, posted before Dec. 11, 2011 [retrieved on Oct. 11, 2012] [posted 10 months earlier then retrieved]. Retrieved from the Internet: <http://www.zenphoto. org/support/topic.php?id=10095> the whole document.
(Continued)

*Primary Examiner* — Farhan Syed
(74) *Attorney, Agent, or Firm* — Ziegler IP Law Group, LLC

(57) ABSTRACT

An apparatus including at least one processor; and at least one memory including computer program code; the at least one memory and the computer program code configured to, with the at least one processor, cause the apparatus to: maintain a multimedia data item associated with metadata, the metadata including geographic location data; and perform reverse geocoding from a geocoding database, for determining first address information for the geographic location data, using a first search language. The at least one memory and the computer program code further configured to, with the at least one processor, cause the apparatus to: determine country information from the first address information; retrieve a preferred language based on the country information; perform reverse geocoding from the geocoding database, for determining second address information for the geographic location data, using the preferred language;
(Continued)

define search codes using the first address information and the second address information; and store at least one search code to the metadata as a searchable metadata element for subsequent retrieval of the multimedia data item based on the searchable metadata element.

18 Claims, 4 Drawing Sheets

(56) References Cited

U.S. PATENT DOCUMENTS

| | | | |
|---|---|---|---|
| 7,260,570 B2* | 8/2007 | Brown et al. | |
| 7,840,581 B2* | 11/2010 | Ross et al. | 707/758 |
| 8,644,852 B2* | 2/2014 | Jones | H04W 4/02 370/252 |
| 8,804,574 B2* | 8/2014 | Siomina et al. | 370/259 |
| 9,037,160 B2* | 5/2015 | Jones | H04W 4/02 370/252 |
| 2003/0225725 A1* | 12/2003 | Miller et al. | 707/1 |
| 2004/0153306 A1* | 8/2004 | Tanner et al. | 704/4 |
| 2005/0246324 A1* | 11/2005 | Paalasmaa | G06F 17/30864 |
| 2006/0080286 A1* | 4/2006 | Svendsen | 707/3 |
| 2008/0016066 A1* | 1/2008 | Kuznetsov | G06F 17/30327 |
| 2008/0098302 A1* | 4/2008 | Roose | G06F 17/2735 715/257 |
| 2008/0301092 A1* | 12/2008 | Jayanti et al. | 707/3 |
| 2009/0132469 A1* | 5/2009 | White et al. | 707/2 |
| 2009/0222482 A1* | 9/2009 | Klassen | G06F 17/30241 |
| 2009/0326914 A1* | 12/2009 | Joy et al. | 704/3 |
| 2010/0217525 A1* | 8/2010 | King | G06Q 30/02 701/300 |
| 2010/0250599 A1 | 9/2010 | Schmidt et al. | |
| 2011/0029398 A1* | 2/2011 | Boudville | G06F 17/3087 705/26.1 |
| 2012/0054174 A1* | 3/2012 | Gagnier | G06F 17/30522 707/714 |
| 2012/0082091 A1* | 4/2012 | Siomina et al. | 370/328 |
| 2012/0209783 A1* | 8/2012 | Smith, Jr. | G06Q 30/02 705/308 |
| 2013/0260797 A1* | 10/2013 | Jones | H04W 4/02 455/456.3 |
| 2014/0040371 A1* | 2/2014 | Gurevich et al. | 709/204 |
| 2014/0208338 A1* | 7/2014 | Rahja | H04L 65/4084 725/5 |

FOREIGN PATENT DOCUMENTS

| | | |
|---|---|---|
| EP | 1881425 A1 | 1/2008 |
| EP | 2096857 A1 | 9/2009 |
| EP | 2211276 A1 | 7/2010 |

OTHER PUBLICATIONS

Search Report dated Oct. 22, 2011, Finnish Patent Application No. 20116331.

International Search Report and Written Opinion; dated Apr. 25, 2013, International Patent Application No. PCT/FI2012/051270; (15 Pages).

Office Action; National Board of Patents and Registration of Finland; FI Patent Application No. 20116331; dated Oct. 22, 2012 (6 pages).

Extended European Search Report received for European Patent Application No. EP12862444.2-1507/2798538 PCT/FI2012051270, dated Jul. 23, 2015, 7 pages.

Anonymous: "How to get the official language from latitude and longitude",, Nov. 12, 2011 (Nov. 12, 2011), XP55190168, Retrieved from the Internet:URL:http://stackoverflow.com/feeds/guestion/8104069.

Canadian Intellectual Property Office Office Action for Application No. 2,860,498, dated Oct. 26, 2015, 10 pages.

* cited by examiner

METHOD AND APPARATUS FOR PROVIDING METADATA SEARCH CODES TO MULTIMEDIA

TECHNICAL FIELD

The present application generally relates to a method and apparatus for providing metadata search codes to multimedia.

BACKGROUND ART

A mobile apparatus may create multimedia data using, for example, camera and voice recording means for producing still images and/or streaming voice or video data. The mobile apparatus may also have some connectivity means for connecting the device to a network or to another device for uploading the captured images from the storage media of the camera to another storage media.

Services exist in networks, e.g. the Internet, for managing data, e.g. multimedia data, received from mobile apparatuses. The services are typically accessed via a web browser or using a client application made specifically for the purpose of accessing the service.

Mobile apparatuses are also connectable to devices such as cameras using a wired or wireless data communication means. The wired data communication means may be e.g. a USB (Universal Serial Bus) connection. The wireless data communication means may utilize be e.g. a Bluetooth™ or a Wireless LAN connection between the apparatus and the camera.

Multimedia data items captured by the mobile apparatuses may be associated with metadata. Such metadata may comprise, for example, geographic location data. The geographic location data may comprise global satellite positioning system data, such as GPS data. The multimedia data items associated with the metadata may be stored to a server apparatus to be searchable for other users.

Service systems providing multimedia data items are typically available to users worldwide. Thus, a solution is needed to improve the providing of multimedia data items associated with metadata with different geographical areas and different languages.

SUMMARY

According to a first example aspect of the invention there is provided an apparatus comprising:
  at least one processor; and
  at least one memory including computer program code;
the at least one memory and the computer program code configured to, with the at least one processor, cause the apparatus to:
  maintain a multimedia data item associated with metadata, the metadata comprising geographic location data;
  perform reverse geocoding from a geocoding database, for determining first address information for the geographic location data, using a first search language;
  wherein the at least one memory and the computer program code further configured to, with the at least one processor, cause the apparatus to:
  determine country information from the first address information;
  retrieve a preferred language based on the country information;
  perform reverse geocoding from the database, for determining second address information for the geographic location data, using the preferred language;
  define search codes using the first address information and the second address information; and
  store at least one search code to the metadata as a searchable metadata element for subsequent retrieval of the multimedia data item based on the searchable metadata element.

In an embodiment, the apparatus further comprises a communication interface for data communication; wherein the at least one memory and the computer program code further configured to, with the at least one processor, cause the apparatus to:
  receive a search request comprising a keyword, using the communication interface;
  perform a search based on the keyword, to identify the multimedia data item associated with the searchable metadata element corresponding to the keyword; and
  transmit the identified multimedia data item as a response to the search request.

The apparatus may further comprise a local database comprising at least one of the following:
  a multimedia database for storing multimedia data items associated with metadata;
  the geocoding database; and
  a language database for retrieving the preferred language based on the country information.

In an embodiment, the at least one memory and the computer program code further configured to, with the at least one processor, cause the apparatus to:
  access a remote database over the communication interface, wherein the remote database comprising at least one of the following:
    a multimedia database for storing multimedia data items associated with metadata;
    the geocoding database; and
    a language database for retrieving the preferred language based on the country information.

The geographic location data may comprise global satellite positioning system data or cellular positioning data, for example. The first and the second address information may comprise street address information.

In an embodiment, the first search language is English and the preferred language comprises at least one official language of a country determined based on the country information.

In an embodiment, the at least one memory and the computer program code are further configured to, with the at least one processor, cause the apparatus to:
  concatenate at least two search codes with a separator to form a concatenated set of search codes; and
  store the concatenated set of search codes as the searchable metadata element.

According to a second example aspect of the invention there is provided a method comprising:
  maintaining a multimedia data item associated with metadata, the metadata comprising geographic location data;
  performing reverse geocoding from a geocoding database, for determining first address information for the geographic location data, using a first search language;
  wherein the method further comprising:
  determining country information from the first address information;
  retrieving a preferred language based on the country information;

performing reverse geocoding from the geocoding database, for determining second address information for the geographic location data, using the preferred language;

defining search codes using the first address information and the second address information; and storing at least one search code to the metadata as a searchable metadata element for subsequent retrieval of the multimedia data item based on the searchable metadata element.

In an embodiment, the method further comprises:

receiving a search request comprising a keyword;

performing a search based on the keyword, to identify the multimedia data item associated with the searchable metadata element corresponding to the keyword; and transmitting the identified multimedia data item as a response to the search request.

The method may further comprise:

concatenating at least two search codes with a separator to form a concatenated set of search codes; and storing the concatenated set of search codes as the searchable metadata element.

According to a third example aspect of the invention there is provided a computer program embodied on a computer readable medium comprising computer executable program code which, when executed by at least one processor of an apparatus, causes the apparatus to:

maintain a multimedia data item associated with metadata, the metadata comprising geographic location data;

perform reverse geocoding from a geocoding database, for determining first address information for the geographic location data, using a first search language;

wherein the computer executable program code which, when executed by at least one processor of an apparatus, causes the apparatus to:

determine country information from the first address information;

retrieve a preferred language based on the country information;

perform reverse geocoding from the geocoding database, for determining second address information for the geographic location data, using the preferred language;

define search codes using the first address information and the second address information; and store at least one search code to the metadata as a searchable metadata element for subsequent retrieval of the multimedia data item based on the searchable metadata element.

According to a fourth example aspect of the invention there is provided a mobile device comprising:

at least one processor; and at least one memory including computer program code;

the at least one memory and the computer program code configured to, with the at least one processor, cause the mobile device to:

generate a multimedia data item associated with metadata, the metadata comprising geographic location data; and transmit the multimedia data item associated with the metadata for a server apparatus.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
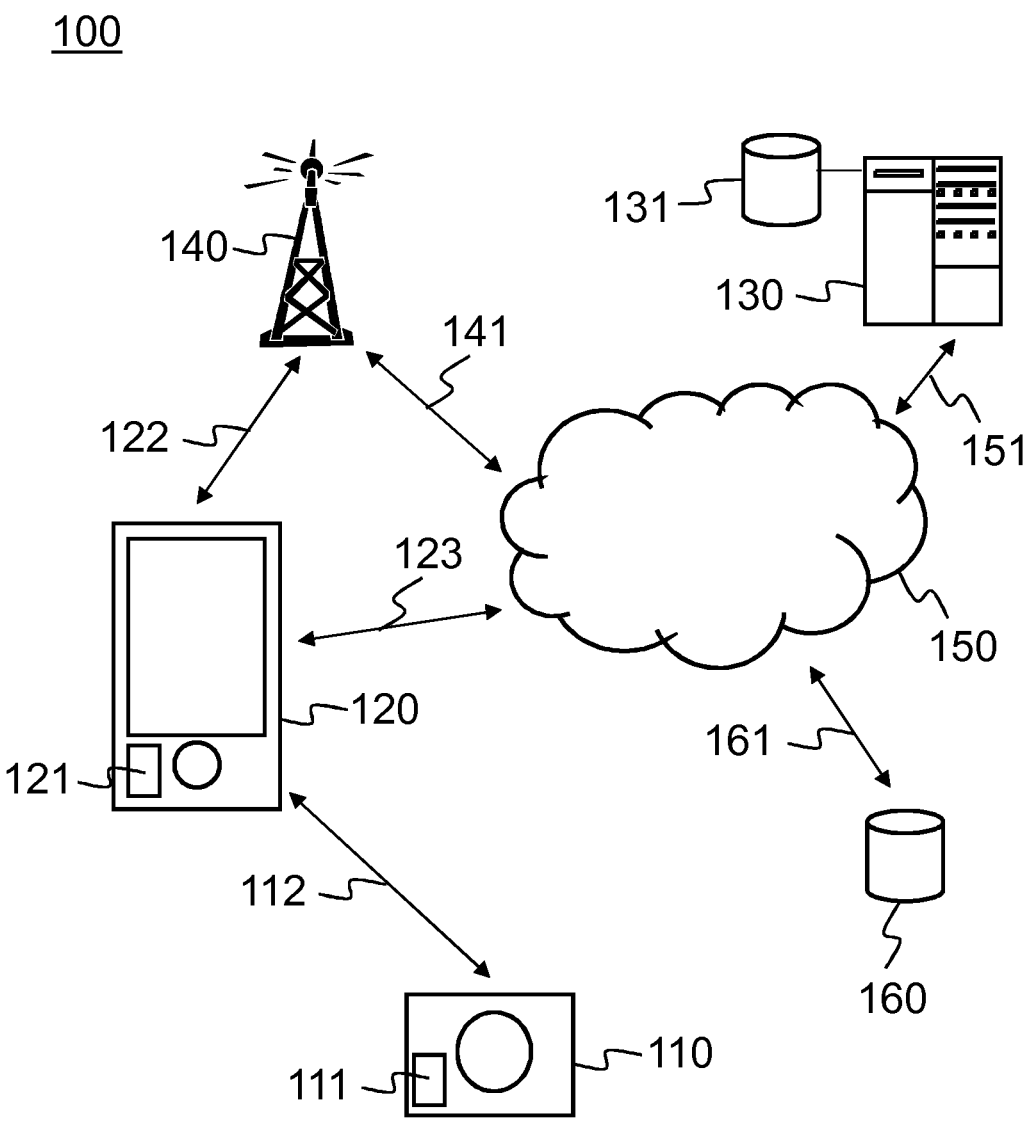
FIG. 1 shows a schematic picture of a system according to an example embodiment of the invention.

FIG. 1 shows a schematic picture of a system 100 according to an example embodiment of the invention. The system 100 comprises a multimedia device 110 configured to be capable of capturing multimedia, such as digital still images and/or video streams. The multimedia device 110 may comprise a storage 111 for multimedia data. The storage 111 may comprise a flash memory card, for example. The multimedia device 110 is configured to be connectable to a mobile device 120 over a data connection 112. The data connection 112 may be a wired connection or a wireless connection. The wired connection may comprise Universal Serial Bus (USB), High-Definition Multimedia Interface (HDMI) or local area network (LAN), for example. The wireless connection may comprise Bluetooth™, Radio Frequency Identification (RF-ID) or wireless local area network (WLAN), for example.

The multimedia device 110 is configured to send captured multimedia data over the data connection 112 to the mobile device 120. The multimedia device 110 may be configured to send captured multimedia data over the data connection 112 initiated by a user of the multimedia device 110, by a user of the mobile device 120, or automatically based on settings. Such settings may comprise for example time of the day, amount of newly captured multimedia data or existence of the data connection 112 for the multimedia device 110.

The mobile device 120 may comprise a mobile phone, an internet tablet or a laptop computer, for example. The mobile device 120 is capable of downloading and locally executing software program code. The software program code may be a client application of a service whose server application is running on a server apparatus 130 of the system 100. The mobile device 120 may comprise multimedia capturing element, such as a camera, for capturing multimedia, such as still images or video streams, for example. The mobile device 120 may also have a metadata element 121 for creating data usable as metadata of the multimedia content captured by the multimedia device 110 or by the mobile device 120. The metadata element 121 may comprise at least one of the following: a microphone, a positioning device for determining the current location of the mobile device 120, and a clock. The mobile device 120 is configured to be connectable to a wireless communication network 140 over a wireless connection 122. The wireless connection 122 may comprise an access to a mobile cellular network or a wireless local area network (WLAN), for example. The wireless communication network may be to a public data communication network 150, for example the Internet, over a data connection 141.

In an embodiment, the mobile device 120 is configured to be connectable to the public data communication network 150, for example the Internet over a data connection 123. The data connection 123 may comprise any wired or wireless connection described for the connection 112 between the mobile device 120 and the multimedia device 110, for example.

In an embodiment, the system 100 comprises a server apparatus 130, which comprises a storage device 131, such as a database, for storing service data, multimedia, and metadata either received over a data connection 151 or generated by the server apparatus 130. The service data may comprise for example at least one of the following: reverse geocoding data, language data, and user data. Multimedia data item captured by the multimedia device 110 or the mobile device 120 may be transferred to the server apparatus 130 over different paths 122, 123, 141, 150, 151. Metadata, such as geographical location data, may be associated with the captured multimedia data item in the mobile device 120 by the proprietary application or by the user, for example.

The system 100 may also comprise an external database 160 for storing corresponding data as the database 131, and providing a remote storage accessible by the server apparatus 130 over a data connection 150, 151, 161. The remote database 160 may be provided by a different service provider than the service provider of server apparatus 130.

In an embodiment, a proprietary application in the mobile device 120 may be a client application of a service whose server application is running on the server apparatus 130 of the system 100. The proprietary application may capture the multimedia data. Also metadata for the captured multimedia may be retrieved by the proprietary application from the metadata elements 121 of the mobile device 120. The metadata elements 121 may comprise a positioning device for determining the current location of the mobile device 120.

The positioning device 121 may comprise a global satellite positioning system device, such as a GPS device, to provide geographical location data. Such data may comprise for example latitude and longitude coordinates.

The positioning device 121 may further comprise a cellular positioning device for providing geographical location data. The cellular positioning device may provide mobile device based positioning or network based positioning, for example. The mobile device based technique determines the location of the mobile device by computing its location by cell identification, signal strengths of the home and neighboring cells, which is continuously sent to the carrier. The network based positioning technique may determine a base station sector in which the mobile phone resides and roughly estimate also the distance to the base station. Further approximation can be done by interpolating signals between adjacent antenna towers. Furthermore, cell identification may be used for positioning, as well as triangulation. Still a further possibility is to use forward link timing methods for mobile device position calculation.

In an embodiment, a default application may be an imaging application of the mobile device 120. Multimedia data captured by the default application may be imported to the proprietary application before transmitting to the server apparatus 130. The proprietary application may check the multimedia data and extract and apply metadata for the multimedia data. Multimedia may also be captured by the multimedia device 110 and transmitted over a data connection 112 to the proprietary application of the mobile device 120 for sending to the server apparatus 130. The proprietary application may check the multimedia data and extract and apply metadata for the multimedia data. User may provide additional metadata using the mobile device 120. In an embodiment, the user may access the multimedia data item on the server apparatus 130 and provide additional metadata, such as geographical location data for the multimedia data item.

Figure 2:
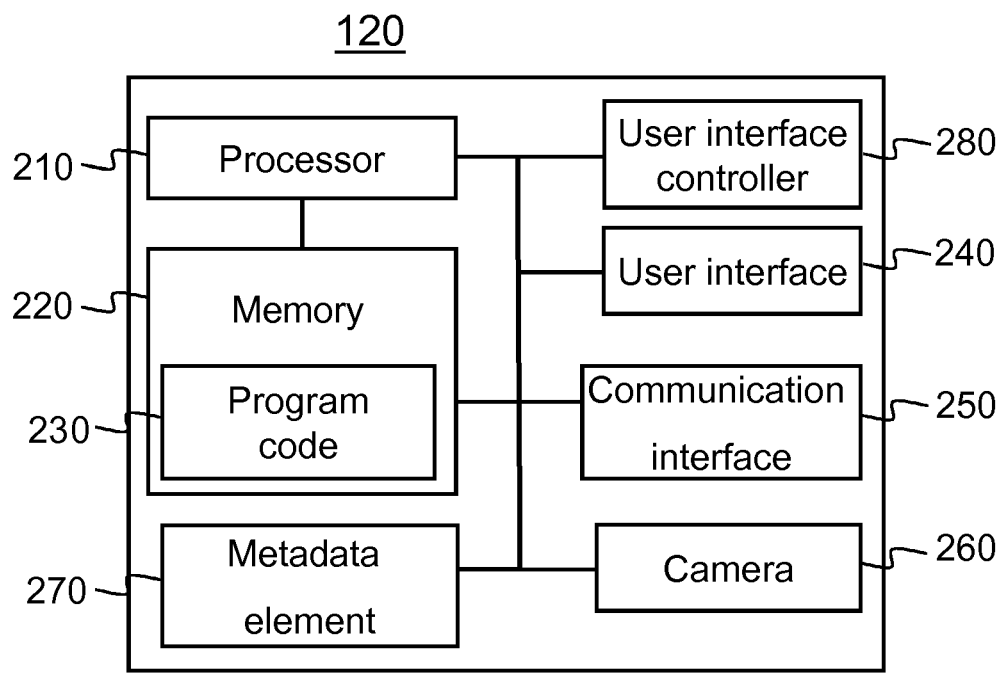
FIG. 2 presents an example block diagram of a mobile device in which various embodiments of the invention may be applied.

FIG. 2 presents an example block diagram of a mobile device 120 in which various embodiments of the invention may be applied. The mobile device 120 may be a user equipment (UE), user device or apparatus, such as a mobile terminal, a laptop, a tablet, a smart phone or other communication device.

The general structure of the mobile device 120 comprises a user interface 240, a communication interface 250, a metadata element 270, a camera 260, a processor 210, and a memory 220 coupled to the processor 210. The mobile device 120 further comprises software 230 stored in the memory 220 and operable to be loaded into and executed in the processor 210. The software 230 may comprise one or more software modules and can be in the form of a computer program product. The mobile device 120 may further comprise a user interface controller 280.

The processor 210 may be, e.g., a central processing unit (CPU), a microprocessor, a digital signal processor (DSP), a graphics processing unit, or the like. FIG. 2 shows one processor 210, but the mobile device 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The mobile device 120 may comprise a plurality of memories. The memory 220 may be constructed as a part of the mobile device 120 or it may be inserted into a slot, port, or the like of the mobile device 120 by a user. The memory 220 may serve the sole purpose of storing data, or it may be constructed as a part of an apparatus serving other purposes, such as processing data. A proprietary multimedia application, a default multimedia application and multimedia data may be stored to the memory 220.

The user interface controller 280 may comprise circuitry for receiving input from a user of the mobile device 120, e.g., via a keyboard, graphical user interface shown on the display of the user interfaces 240 of the mobile device 120, speech recognition circuitry, or an accessory device, such as a headset, and for providing output to the user via, e.g., a graphical user interface or a loudspeaker.

The metadata element 270 comprises element configured to provide metadata information. Such elements may comprise, for example, a positioning device, an accelerometer, a temperature gauge, a clock or a microphone. The positioning device 279 may comprise for example a global satellite positioning system device, such as a GPS receiver or a cellular network based positioning device.

The camera 260 may be a still image camera or a video stream camera, capable for creating multimedia data.

The communication interface module 250 implements at least part of data transmission. The communication interface module 250 may comprise, e.g., a wireless or a wired interface module. The wireless interface may comprise such as a WLAN, Bluetooth™, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 250 may be integrated into the mobile device 120, or into an adapter, card or the like that may be inserted into a suitable slot or port of the mobile device 120. The communication interface module 250 may support one radio interface technology or a plurality of technologies. The mobile device 120 may comprise a plurality of communication interface modules 250. Captured multimedia associated with metadata may be transmitted to a wireless communication network 140 using the communication interface 250.

A skilled person appreciates that in addition to the elements shown in FIG. 2, the mobile device 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the mobile device 120 may comprise a disposable or rechargeable battery (not shown) for powering when external power if external power supply is not available.

In an embodiment, the mobile device 120 comprises speech recognition means. Using these means, a pre-defined phrase may be recognized from the speech and translated into a metadata tag. This tag may then be used as any other metadata, for example for characterizing the captured multimedia or for grouping images together, for example.

Figure 3:
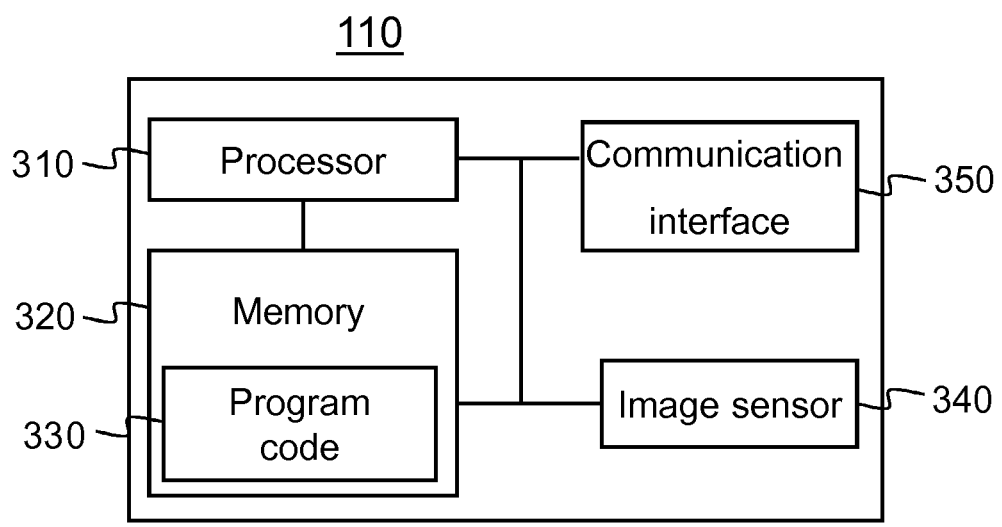
FIG. 3 presents an example block diagram of a multimedia device in which various embodiments of the invention may be applied.

FIG. 3 presents an example block diagram of a multimedia device 110 in which various embodiments of the invention may be applied. The multimedia device 110 may be a digital still camera or digital video camera, for example.

The general structure of the multimedia device 110 comprises a processor 310, and a memory 320 coupled to the processor 310. The multimedia device 110 further comprises software 330 stored in the memory 320 and operable to be loaded into and executed in the processor 310. The software 330 may comprise one or more software modules and can be in the form of a computer program product.

The processor 310 may be, e.g., a central processing unit (CPU), a microprocessor, a digital signal processor (DSP), a graphics processing unit, or the like. FIG. 3 shows one processor 310, but the multimedia device 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The multimedia device 110 may comprise a plurality of memories. The memory 320 may be constructed as a part of the multimedia device 110 or it may be inserted into a slot, port, or the like of the multimedia device 110 by a user. The memory 320 may serve the sole purpose of storing data, or it may be constructed as a part of an apparatus serving other purposes, such as processing data.

The image sensor 340 may be a device converting an optical image into an electronic signal, for example a charge-coupled device (CCD) or a complementary metal-oxide-semiconductor (CMOS) active pixel sensor.

The communication interface module 350 implements at least part of data transmission. The communication interface module 350 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 350 may be integrated into the multimedia device 110, or into an adapter, card or the like that may be inserted into a suitable slot or port of the multimedia device 110. The communication interface module 350 may support one radio interface technology or a plurality of technologies. The multimedia device 110 may comprise a plurality of communication interface modules 350. Captured multimedia data of the multimedia device 110 may be transmitted to the mobile device 120 using the communication interface 350.

Figure 4:
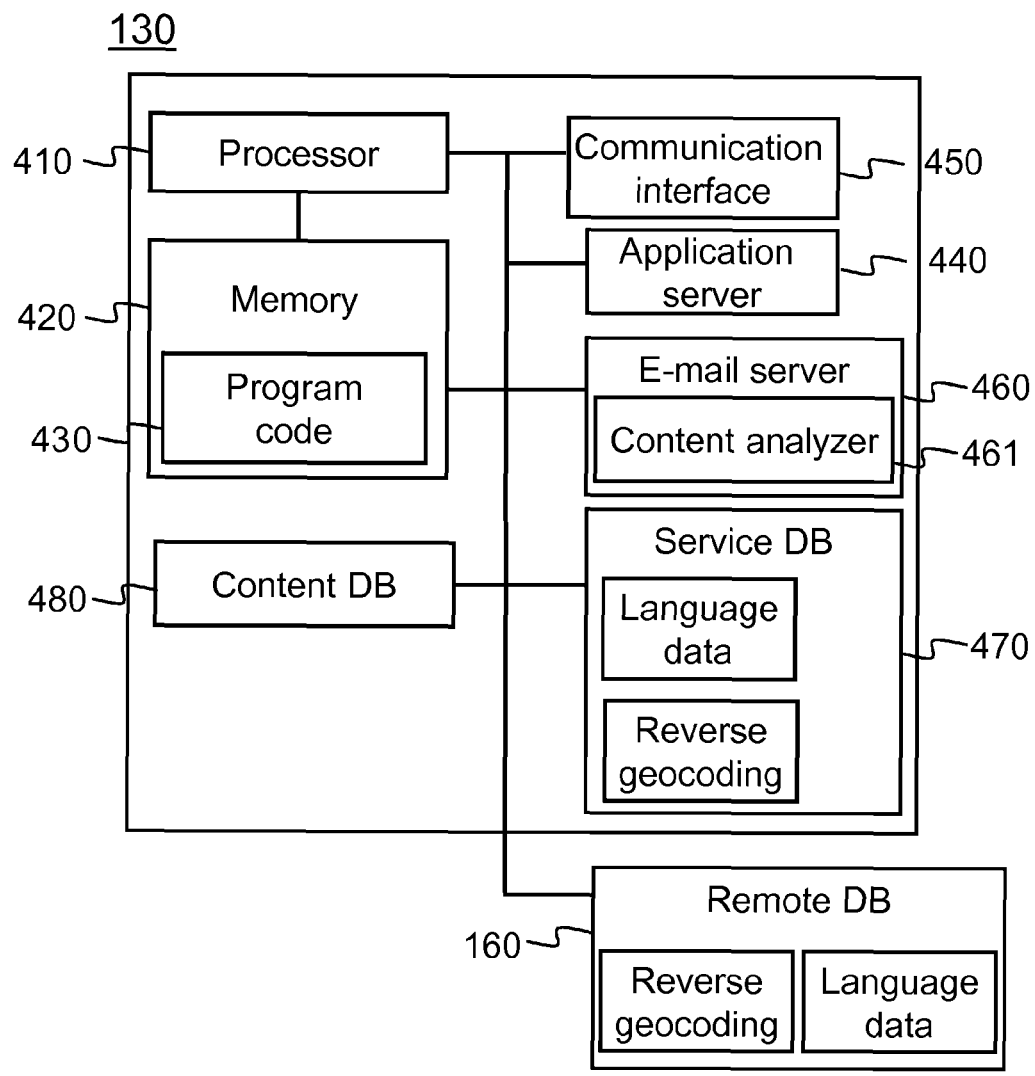
FIG. 4 presents an example block diagram of an apparatus in which various embodiments of the invention may be applied.

A skilled person appreciates that in addition to the elements shown in FIG. 3, the multimedia device 110 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the multimedia device 110 may comprise a disposable or rechargeable battery (not shown) for powering when external power if external power supply is not available FIG. 4 presents an example block diagram of an apparatus in which various embodiments of the invention may be applied. The apparatus may comprise a server apparatus 130, for example.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. The server apparatus 130 may comprise a plurality of communication interface modules 450. Captured multimedia data of the multimedia device 110 or the mobile device 120 may be received by the server apparatus 130 using the communication interface 450.

The e-mail server process 460, which receives e-mail messages sent from mobile devices 120 via the network 150. The e-mail server 460 may comprise a content analyzer module 461, which checks if the content of the received message meets the criteria that are set for new content data of the service. The content analyzer module 461 may for example check, whether the e-mail message contains a valid still image or a video stream and valid metadata, such as geographical location data. The valid content data received by the e-mail server 460 is then sent to an application server 440, which provides application services. Content provided by the service system 100 is stored in a content database 480.

In an embodiment, a server apparatus 130 provides adaptive method to generate searchable geographic data. The server apparatus 130 may store multimedia data items, such as photos of a system 100, for example to a content database 480 with geographic coordinates (e.g. latitude/longitude). Using the geographic coordinates, a reverse geocode lookup is performed from a remote database 160 retrieving a textual address of the location in English. In an embodiment, a service database 470 of the server apparatus 130 may be used instead of, or in addition to the remote database 160.

The reverse geocoding provides country information for the geographic coordinates. Hence, the country where the multimedia item is captured may be determined. When the system 100 targets at providing other users service of searching multimedia data items for a specific geographic location, the target location language should be taken into account. Based on the country information, the preferred languages (language data) of the country may be retrieved from the local database 470 or the remote database 160. For example, in France the preferred language is French, in Belgium preferred languages are Dutch and French, and in Finland preferred languages are Finnish and Swedish.

In an embodiment, the reverse geocoding lookup may be performed with each of the preferred languages of the country (or other geographical area), in which the location resides, pointed by the coordinates. The coordinates are located in the multimedia data item metadata. All performed reverse geocoding results for different languages may be splitted to meaningful tokens or search codes. Such search codes may comprise, for example, country names, names of different levels of administrative regions (state, county, city), street addresses, postal codes etc. Distinct search codes may be then concatenated with a separator (for example a single space character) and stored to the content database 480 among the other metadata of the multimedia data item.

As a result, multimedia data items, such as photos, may match to keyword searches done in English or any preferred language of the region without implementing any search heuristics to handle different languages. For example, search to "Suomi" would match to string containing word "Finland". Hence, the geocode location is adaptive to the location.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

In an embodiment, search codes are defined for received multimedia data item at a server apparatus 130 based on location information of metadata, reverse geocoding, and language information. The search codes may be attached to the multimedia data item for providing improved search ability of multimedia data items for users. The attached search codes enables for an entire lifetime of the multimedia data item, another user interested in the multimedia to use keyword of his own language to find the desired multimedia data item from a desired location. Such feature is useful for example in a system, where a user may deliver captured multimedia from a mobile device 120 or a multimedia device 110 to the server apparatus 130 of the brokering system for other users. The interested user would prefer finding the multimedia data knowing the name of the desired geographic location in one language. The multimedia may comprise for example still images or video streams and may relate to at least one of the following: Breaking news multimedia, interesting person related multimedia, geographical place multimedia, sports multimedia, weather multimedia and culture related multimedia.

Figure 5:
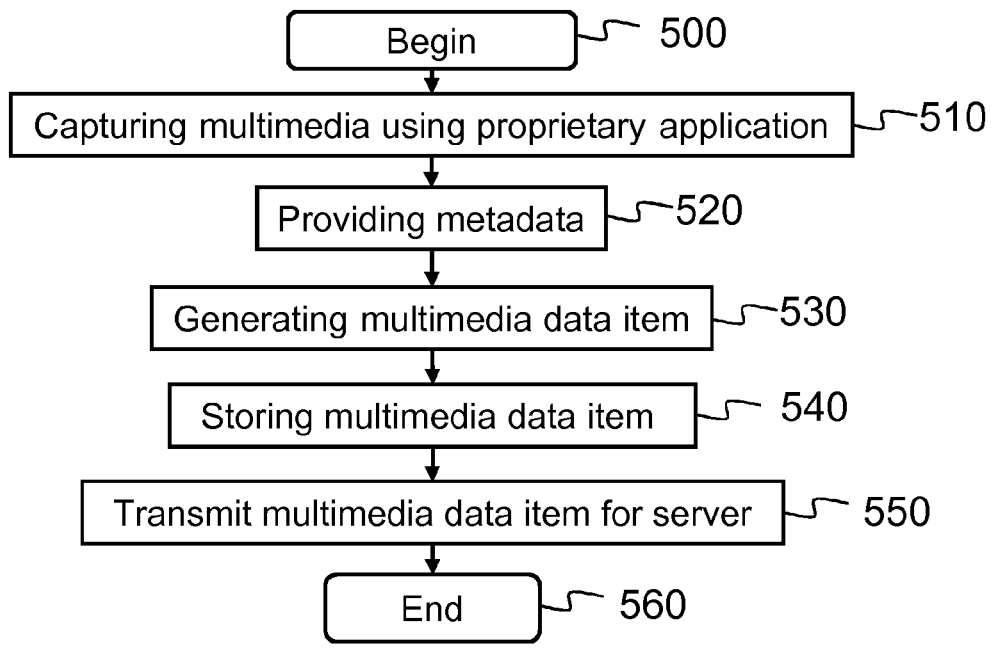
FIG. 5 shows a flow diagram showing operations in accordance with an example embodiment of the invention.

FIG. 5 shows a flow diagram showing operations in accordance with an example embodiment of the invention. In step 500, the method is started. In step 510, multimedia data, e.g. a digital still picture or a video stream, is captured using a proprietary application of a mobile device 120. In step 520, metadata for the captured multimedia is provided by a metadata element 121 for the proprietary application. A multimedia data item is generated using the captured multimedia data and the provided metadata in step 530. In step 540, the multimedia data item is stored in a memory of the mobile device 120. The multimedia item is transmitted for a server apparatus 130 in step 550. The method is ended in step 560.

Figure 6:
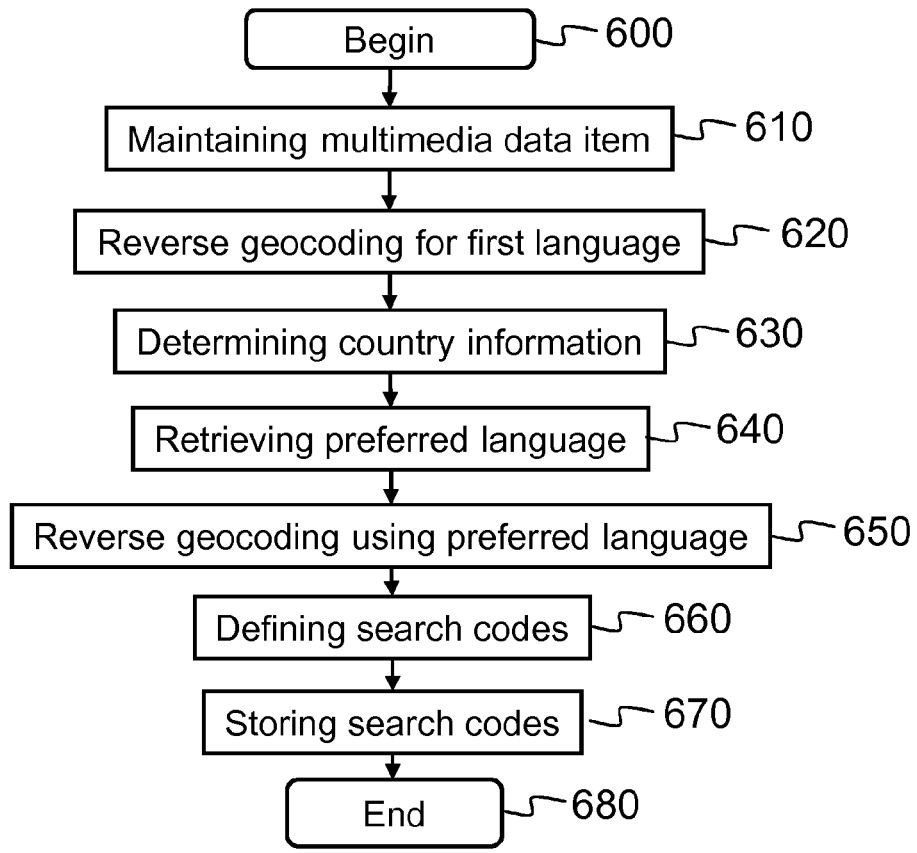
FIG. 6 shows a flow diagram showing operations in accordance with an example embodiment of the invention.

FIG. 6 shows a flow diagram showing operations in accordance with an example embodiment of the invention. In step 600, the method is started. In step 610, a multimedia data item associated with metadata is maintained at the server apparatus, wherein the metadata comprises geographic location data. In step 620, reverse geocoding is performed from a geocoding database, for determining first address information for the geographic location data, using a first search language. Country information is determined from the first address information, in step 630. A preferred language based on the country information is retrieved in step 640. In step 650, reverse geocoding is performed from the geocoding database, for determining second address information for the geographic location data, using the preferred language. In step 660, search codes are defined using the first address information and the second address information. At least one search code is stored to the metadata as a searchable metadata element, in step 670, for subsequent retrieval of the multimedia data item based on the searchable metadata element. The method is ended in step 680.

Figure 7:
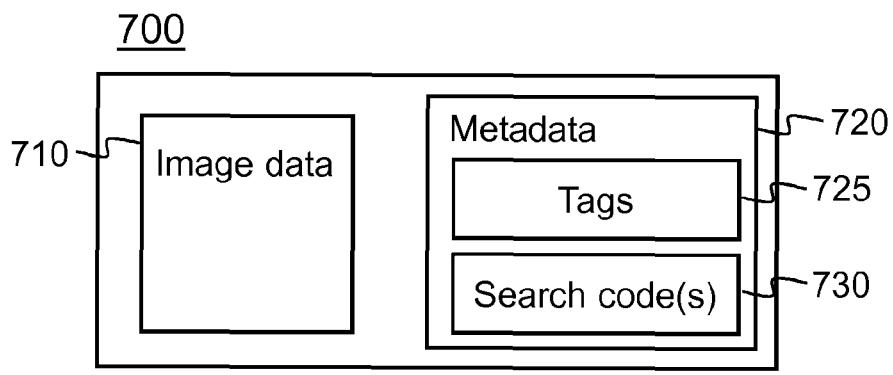
FIG. 7 shows an overall block diagram of an example multimedia data item according to an example embodiment of the invention.

FIG. 7 shows an overall block diagram of an example multimedia data item 700 according to an example embodiment of the invention.

The multimedia data item 700 comprises multimedia data 710, such as image data. Furthermore, the multimedia data item 700 comprises metadata 720. In an embodiment, the metadata 720 comprises at least one search code 730 as a searchable metadata element for subsequent retrieval of the multimedia data item 700.

The metadata 720 may be written into the multimedia data item 700 for identifying who owns the multimedia data 710, copyright & contact information, what camera created the file, along with exposure information and descriptive information such as keywords about the photo, making the file searchable on the computer and/or the Internet. Some metadata 720 may be written by the camera and further metadata 720 may be input by the photographer, user and/or computer software after downloading the multimedia data 710 to a computer, for example.

The metadata 720 may be configured to use a certain standard format, such as Exchangeable Image Format (EXIF). Specifically, FIG. 7 illustrates a single digital image 700 stored in the EXIF format, such as in a file on a computer or on a removable media device in a digital camera. As will be appreciated by those skilled in the art, an EXIF file 700 may contain multiple digital images having a similar format. The metadata 720 may also comprise at least two metadata, for example simple metadata and complex metadata. In FIG. 7 only a single metadata 720 is showed, for simplicity. The metadata 720 may include tags 725. The tags 725 include information such as descriptions, copyright information, date and time information, camera settings such as camera model and make, and information that varies with each image such as orientation (rotation), aperture, shutter speed, focal length, metering mode, location information, and ISO speed information. The tags may further comprise a thumbnail for previewing the picture on the camera's LCD screen, in file managers, or in photo manipulation software.

The metadata 720 format may comprise standard tags 725 for location information. Cameras and mobile devices may have a built-in GPS receiver or a cellular positioning device that stores the location information in the metadata tags 725 when the picture is taken. Some other cameras have a separate GPS receiver that fits into the flash connector, for example. Recorded GPS data can also be added to any digital photograph on a computer, either by correlating the time stamps of the photographs with a GPS record from a hand-held GPS receiver or manually using a map or mapping software. The process of adding geographic information to a photograph is known as geocoding. A system server may allow their users to upload geocoded pictures or to add geolocation information online.

In an embodiment, geographic location data is comprised in the tags 725. Furthermore, the search codes 730 may be comprised in the tags 725.

In an embodiment, the metadata 720 may be configured to use any other standard format, such as:

IPTC Information Interchange Model IIM (International Press Telecommunications Council),
IPTC Core Schema for XMP,
XMP—Extensible Metadata Platform (an Adobe standard),
Dublin Core (Dublin Core Metadata Initiative—DCMI), or
PLUS (Picture Licensing Universal System).

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A server apparatus comprising:
   at least one processor; and
   at least one memory including computer program code;
   the at least one memory and the computer program code configured to, with the at least one processor, cause the server apparatus to:
      receive from a mobile device of a first user a multimedia data item associated with metadata, the metadata comprising geographic location data, the multimedia data item is captured by a proprietary application of the mobile device and the metadata for the captured multimedia data item is retrieved by the proprietary application from metadata elements of the mobile device, wherein the proprietary application in the mobile device is a client application of a service whose server application is running on the server apparatus;
      perform reverse geocoding, by the server application, from a geocoding database, for determining first address information for the geographic location data, using a first search language;
      determine, by the server application, country information from the first address information;
      retrieve, by the server application, a preferred language based on the country information wherein the preferred language comprises at least one official language of a country determined based on the country information;
      perform, by the server application, reverse geocoding from the geocoding database, for determining second address information for the geographic location data, using each official language of the preferred language;
      define, by the server application, a plurality of search codes of the geographic location data using the first address information and the second address information, the plurality of search codes comprising at least one search code defined using the first address information and at least one search code defined using the second address information;

concatenate, by the server application, the plurality of search codes with a separator to form a concatenated set of search codes; and store, by the server application, the concatenated set of search codes to the metadata as a searchable metadata element for subsequent retrieval of the multimedia data item by a second user based on any of the plurality of search codes of the searchable metadata element.

2. The apparatus of claim 1, further comprising a communication interface for data communication; wherein the at least one memory and the computer program code further configured to, with the at least one processor, cause the apparatus to:

receive a search request comprising a keyword, using the communication interface;

perform a search based on the keyword, to identify the multimedia data item associated with the searchable metadata element corresponding to the keyword; and transmit the identified multimedia data item as a response to the search request.

3. The apparatus of claim 1, further comprising a local database comprising at least one of the following:

a multimedia database for storing multimedia data items associated with metadata;

the geocoding database; and a language database for retrieving the preferred language based on the country information.

4. The apparatus of claim 2, wherein the at least one memory and the computer program code further configured to, with the at least one processor, cause the apparatus to:

access a remote database over the communication interface, wherein the remote database comprising at least one of the following:

a multimedia database for storing multimedia data items associated with metadata;

the geocoding database; and a language database for retrieving the preferred language based on the country information.

5. The apparatus of claim 1, wherein the geographic location data comprises global satellite positioning system data.

6. The apparatus of claim 1, wherein the geographic location data comprises cellular positioning data.

7. The apparatus of claim 1, wherein the first and the second address information comprise street address information.

8. The apparatus of claim 1, wherein the first search language is English.

9. A computer implemented method at a server apparatus comprising:

receiving from a first user a multimedia data item associated with metadata, the metadata comprising geographic location data, the multimedia data item is captured by a proprietary application of the mobile device and the metadata for the captured multimedia data item is retrieved by the proprietary application from metadata elements of the mobile device, wherein the proprietary application in the mobile device is a client application of a service whose server application is running on the server apparatus;

performing, by the server application, reverse geocoding from a geocoding database, for determining first address information for the geographic location data, using a first search language;

determining, by the server application, country information from the first address information;

retrieving, by the server application, a preferred language based on the country information, wherein the preferred language comprises at least one official language of a country determined based on the country information;

performing, by the server application, reverse geocoding from the geocoding database, for determining second address information for the geographic location data, using each official language of the preferred language;

defining, by the server application, a plurality of search codes of the geographic location data using the first address information and the second address information, the plurality of search codes comprising at least one search code defined using the first address information and at least one search code defined using the second address information;

concatenating, by the server application, the plurality of search codes with a separator to form a concatenated set of search codes; and storing, by the server application, the concatenated set of search codes to the metadata as a searchable metadata element for subsequent retrieval of the multimedia data item by a second user based on any of the plurality of search codes of the searchable metadata element.

10. A computer program embodied on a computer readable non-transitory medium comprising computer executable program code which, when executed by at least one processor of a server apparatus, causes the server apparatus to:

receive from a first user a multimedia data item associated with metadata, the metadata comprising geographic location data, the multimedia data item is captured by a proprietary application of the mobile device and the metadata for the captured multimedia data item is retrieved by the proprietary application from metadata elements of the mobile device, wherein the proprietary application in the mobile device is a client application of a service whose server application is running on the server apparatus;

perform, by the server application, reverse geocoding from a geocoding database, for determining first address information for the geographic location data, using a first search language;

determine, by the server application, country information from the first address information;

retrieve, by the server application, a preferred language based on the country information, wherein the preferred language comprises at least one official language of a country determined based on the country information;

perform, by the server application, reverse geocoding from the geocoding database, for determining second address information for the geographic location data, using each official language of the preferred language;

define, by the server application, a plurality of search codes of the geographic location data using the first address information and the second address information, the plurality of search codes comprising at least one search code defined using the first address information and at least one search code defined using the second address information;

concatenate, by the server application, the plurality of search codes with a separator to form a concatenated set of search codes; and store, by the server application, the concatenated set of search codes to the metadata as a searchable metadata element for subsequent retrieval of the multimedia data item by a second user based on any of the plurality of search codes of the searchable metadata element.

11. The method of claim 9, wherein the multimedia data item comprises a photo.

12. The method of claim 9, wherein search codes are defined for received multimedia data item at a server apparatus based on location information of metadata, reverse geocoding, and language information.

13. The method of claim 11, wherein a user delivering captured multimedia from a mobile device or a multimedia device to the server apparatus of a brokering system for other users.

14. The method of claim 12, wherein an interested user finding multimedia data using a name of a desired geographic location in one language.

15. The method of claim 9, wherein the multimedia data item comprising multimedia data and metadata.

16. The method of claim 14, wherein the multimedia data comprising still image data or video stream data.

17. The method of claim 15, wherein the multimedia data relate to at least one of the following: breaking news multimedia, interesting person related multimedia, geographical place multimedia, sports multimedia, weather multimedia and culture related multimedia.

18. The method of claim 14, wherein the metadata comprises copyright information, contact information or information for identifying who owns the multimedia data.

* * * * *